United States Patent [19]
Wells et al.

[11] Patent Number: 6,009,497

[45] Date of Patent: *Dec. 28, 1999

[54] METHOD AND APPARATUS FOR UPDATING FLASH MEMORY RESIDENT FIRMWARE THROUGH A STANDARD DISK DRIVE INTERFACE

[75] Inventors: Steven E. Wells, Citrus Heights; Virgil Niles Kynett, El Dorado Hills; Terry L. Kendall, Placerville; Richard Garner, Cameron Park; Dave M. Brown, Fair Oaks, all of Calif.

[73] Assignee: Intel Corporation, Santa Clara, Calif.

[*] Notice: This patent is subject to a terminal disclaimer.

[21] Appl. No.: 09/189,000

[22] Filed: Nov. 9, 1998

Related U.S. Application Data

[63] Continuation of application No. 08/019,766, Feb. 19, 1993, Pat. No. 5,835,933.

[51] Int. Cl.⁶ .................................................. G06F 12/02
[52] U.S. Cl. ...................... 711/103; 711/104; 365/185.35
[58] Field of Search .................................. 711/102–104; 371/10.2, 21.1; 365/185.22, 185.29, 185.33, 218, 185.01, 94; 712/32, 37; 714/710, 718

[56] References Cited

U.S. PATENT DOCUMENTS

| | | | |
|---|---|---|---|
| 4,642,759 | 2/1987 | Foster | 395/500.45 |
| 4,644,494 | 2/1987 | Muller | 711/152 |
| 4,763,305 | 8/1988 | Kuo | 365/185.22 |
| 4,802,117 | 1/1989 | Chrosny et al. | 714/5 |
| 4,896,262 | 1/1990 | Wayama et al. | 710/65 |
| 4,958,315 | 9/1990 | Balch | 395/500.45 |
| 5,012,425 | 4/1991 | Brown | 705/405 |
| 5,047,989 | 9/1991 | Canepa et al. | 365/238.5 |
| 5,070,474 | 12/1991 | Tuma et al. | 395/500.45 |
| 5,077,737 | 12/1991 | Leger et al. | 714/6 |
| 5,101,490 | 3/1992 | Getson, Jr. et al. | 395/835 |
| 5,111,385 | 5/1992 | Hattori | 711/157 |
| 5,131,089 | 7/1992 | Cole | 395/500.45 |
| 5,199,033 | 3/1993 | McGeoch et al. | 714/7 |
| 5,200,959 | 4/1993 | Gross et al. | 714/723 |
| 5,224,070 | 6/1993 | Fandrich et al. | 365/185.33 |
| 5,416,782 | 5/1995 | Wells et al. | 714/719 |
| 5,418,752 | 5/1995 | Harari et al. | 365/218 |
| 5,524,230 | 6/1996 | Sakaue et al. | 711/103 |
| 5,566,194 | 10/1996 | Wells et al. | 714/805 |
| 5,602,987 | 2/1997 | Harari et al. | 714/8 |
| 5,630,093 | 5/1997 | Holzmhammer et al. | 711/115 |
| 5,719,808 | 2/1998 | Harari et al. | 365/185.33 |
| 5,740,395 | 4/1998 | Wells et al. | 711/103 |
| 5,835,933 | 11/1998 | Wells et al. | 711/103 |

FOREIGN PATENT DOCUMENTS

| | | |
|---|---|---|
| 2088442 | 1/1993 | Canada . |
| 0 175 458 A2 | 7/1985 | European Pat. Off. . |
| 0 392 895 A2 | 3/1990 | European Pat. Off. . |
| 2 251 323 | 1/1992 | United Kingdom . |
| 2 251 324 | 1/1992 | United Kingdom . |

OTHER PUBLICATIONS

"Flash: Big News in Storage? Are Diskless Computers the Wave of the Future?" Walter Chen, Storage Magazine, Nov./Dec. 1992, pp. 10–4 thru 10–7.

"Solid–State Mass Storage Arrives," Stephen J. Gross, et al., Sun Disk Product Feature, (no date), 4 pgs.

"Trends in Flash Memory System Design," Kurt Robinson, Wescon Conference, Nov. 1990, pp. 468–472.

*Primary Examiner*—John W. Cabeca
*Assistant Examiner*—Denise Tran
*Attorney, Agent, or Firm*—Blakey, Sokoloff, Taylor & Zafman LLP

[57] ABSTRACT

A method for updating the content of EEPROM memory used for controlling processes run on a microprocessor used to control the operations of a long term memory array which includes moving an update process stored in the EEPROM memory to a random access memory associated with the microprocessor; and then using the update process stored in random access memory for erasing the contents of the EEPROM memory, and furnishing data to the microprocessor on a sector by sector basis from a host computer through an interface used by the microprocessor to provide data to the long term memory array. The data furnished by the host is written sector by sector to the EEPROM memory until the EEPROM memory has been updated.

15 Claims, 3 Drawing Sheets

METHOD AND APPARATUS FOR UPDATING FLASH MEMORY RESIDENT FIRMWARE THROUGH A STANDARD DISK DRIVE INTERFACE

This is a continuation of application Ser. No. 08/019,766, filed Feb. 19, 1993, U.S. Pat. No. 5,835,933.

BACKGROUND OF THE INVENTION

1. Field of the Invention

This invention relates to memory arrays and, more particularly, to methods and apparatus for updating electrically-erasable programmable read only memory (EEPROM) which furnishes processes for a microprocessor which controls the operations of the memory array.

2. History of the Prior Art

Modern computer systems make extensive use of long term memory. Typically this memory is provided by one or more electro-mechanical hard (fixed) disk drives. Hard disk drives are very useful and have become almost a necessity to the operation of personal computers. However, such electro-mechanical drives are relatively heavy, require a significant amount of space within a computer, require a significant amount of power in use, and are very susceptible to shock.

Recently, forms of long term storage other than electro-mechanical hard disk drives have become feasible for use in computers. One of these is flash EEPROM. A flash EEPROM memory array includes a large plurality of floating-gate field effect transistors arranged as memory cells in typical row and column fashion with circuitry for accessing the individual cells and placing the memory transistors of those cells in one of two memory conditions. A flash memory cell, like a typical EPROM cell retains information when power is removed but is capable of being programmed in place within the array. Flash EEPROM memory has a number of characteristics which adapt it to use as long term memory. It is light in weight, occupies very little space, and consumes less power than electro-mechanical disk drives. More importantly, it is especially rugged. It will withstand without adverse effects repeated drops each of which would destroy a typical electro-mechanical hard disk drive.

One memory arrangement using flash EEPROM which replaces a typical electro-mechanical hard disk drive includes a control circuit which controls the reading, writing, and erasing of the entire array. This control circuit includes a microprocessor which receives commands from a host computer and runs various processes stored in read only memory in the control circuit in order to manage the memory array. These processes implement operations which enable the array to make better use of its storage space, to read data more accurately, to control defects, to erase in the background, and to conduct many other services for the flash EEPROM memory array. In one embodiment of the control circuit, the read only memory in which these control processes are stored is flash EEPROM. It is desirable to provide processes by which the processes stored in read only memory and used to control the various operations of the flash EEPROM memory array may be changed and updated while the flash EEPROM memory array remains in place within the host computer.

SUMMARY OF THE INVENTION

It is, therefore, an object of the present invention to provide a method for changing the processes stored in read only memory controlling the operation of a microprocessor.

It is another more specific object of the present invention to provide a method for changing the processes stored in flash EEPROM memory used for controlling the operation of a microprocessor which in turn controls a long term flash EEPROM memory array.

These and other objects of the present invention are realized in a method for updating the content of EEPROM memory used for storing processes run on a microprocessor used to control the operations of a long term memory array comprising the steps of writing an update process stored in the EEPROM memory to a random access memory associated with the microprocessor; and then using the update process stored in random access memory for erasing the contents of the EEPROM memory, for furnishing data to the microprocessor on a sector by sector basis from a host computer through an interface used by the microprocessor to provide data to the long term memory array, for writing each sector of data to the EEPROM memory, and for continuing the furnishing of sectors of data to the microprocessor and writing the sectors of data to the EEPROM memory until the EEPROM memory has been updated.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to an apparatus and to a method for operating a computer in processing electrical or other (e.g. mechanical, chemical) physical signals to generate other desired physical signals.

DETAILED DESCRIPTION

Figure 1:
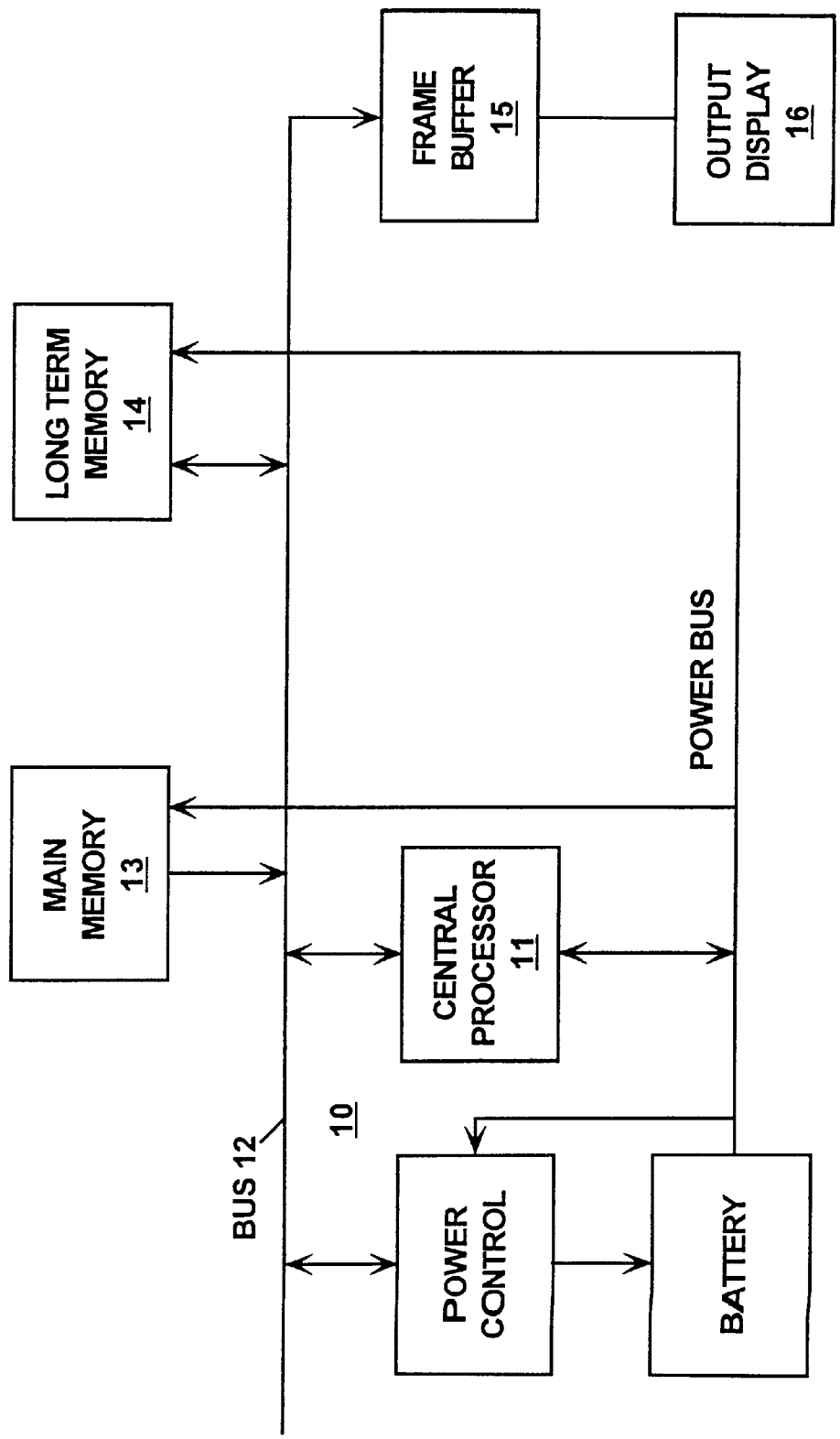
FIG. 1 is a block diagram illustrating a computer system which may include the present invention.

Referring now to FIG. 1, there is illustrated a computer system 10. The system 10 includes a central processor 11 which carries out the various instructions provided to the computer 10 for its operations. The central processor 11 is joined to a bus 12 adapted to carry information to various components of the system 10. Also connected to the bus 12 is main memory 13 which is typically constructed of dynamic random access memory arranged in a manner well known to those skilled in the prior art to store information being used by the central processor during the period in which power is provided to the system 10.

Also connected to the bus 12 are various peripheral components such as long term memory 14. The construction and operation of long term memory 14 are well known to those skilled in the art. Typically such long term memory may be one or more electro-mechanical hard disk drives. However, such memory may also comprise flash EEPROM memory arrays constructed in a manner to replace the typical electro-mechanical hard disk drives. Such a flash EEPROM memory array is utilized in practicing the present invention. In addition to long term memory 14 and other peripheral components, circuitry may also be coupled to the bus 12 such as a frame buffer 15 to which data may be written for transfer to an output display device 16. All such circuitry is well known to those skilled in the art and requires no further discussion in the present specification.

A flash EEPROM memory array used for long term memory such as the memory 14 illustrated in FIG. 1 includes a large plurality of floating-gate field effect transistors arranged as memory cells in typical row and column fashion with circuitry for accessing the individual cells and placing the memory transistors of those cells in one of two memory conditions. A peculiarity of flash EEPROM is that it is erased by applying a high voltage simultaneously to the source terminals of all of the transistors (cells) used in a large portion of the array. Because these source terminals are all connected to one another in the array by metallic busing, the entire portion of the array must be erased at once. Unlike an electro-mechanical hard disk which rewrites changed data over the original data in same area of the disk, a flash memory array can only write data to an area which has been erased. Thus, to rewrite changed data to an area containing the original data requires erasing all of the valid information that remains in that portion of the array along with the invalid (dirty) information.

Because of this, one flash EEPROM memory array uses an entirely different arrangement than that used by an electro-mechanical hard disk drive for controlling the writing and the erasing of data. First, the entire array is divided into small separately erasable blocks so that when a block is erased the amount of valid data which must be reprogrammed is reduced. Then, when the information at a data entry changes, the changed information is written to a new position in free space rather than being written over the old data; and the old data is marked dirty. After a sufficient number of sectors on a block have been marked dirty, the entire block is erased. When erasure occurs, all of the valid data still stored in the block which is to be erased is written to a new block; and then the entire block is erased and put back into use as a clean block of memory. Because of this involved erasure process, it typically takes as much as two seconds to erase a block of a flash EEPROM array. However, because erasure need not occur with each entry which is rewritten, erasure may be delayed until a block contains a sufficient amount of dirty information that the operation if feasible. This reduces the number of erasure operations to a minimum and allows erasure to occur in the background when the facilities for controlling the array are not otherwise occupied with reading and writing.

Such an arrangement is disclosed in U.S. patent application Ser. No. 07/969,131, entitled Method And Circuitry For A Solid State Memory Disk, S. Wells et al, filed Oct. 30, 1992, and assigned to the assignee of the present invention.

The circuitry described in that specification includes a control circuit. The control circuit includes a microprocessor which runs various control processes used in managing the data on the flash EEPROM memory array. For example, the processes just described for writing to the array and for erasing the array are two of the control processes which are used to manage data in the array. In the arrangement, the various control processes which are used in managing the data are stored in read only memory within the control circuitry. In one embodiment used in accordance with the present invention, the read only memory is itself flash EEPROM memory which retains its condition when power is removed from the system but which may be electrically erased without removal from the system. Because it is erasable, it is possible to program the flash EEPROM memory while it is in circuit within the array. This allows the processes used for controlling the array to be changed and updated.

However, the changing of the processes stored in flash EEPROM memory normally requires relatively sophisticated circuitry. Such circuitry is not available for erasing and rewriting the processes stored in the flash EEPROM memory which is used to store the control processes for the microprocessor controlling the larger flash memory array. It is desirable that the flash EEPROM memory containing the control processes be updatable through the standard industry interface used for the storage array. It is desirable that the host computer be able to update the control processes stored in the flash EEPROM memory serving as read only memory for the control circuitry in the same manner the host runs other programs. In some cases, it is possible for such a program to be run by a relatively unskilled user.

Figure 2:
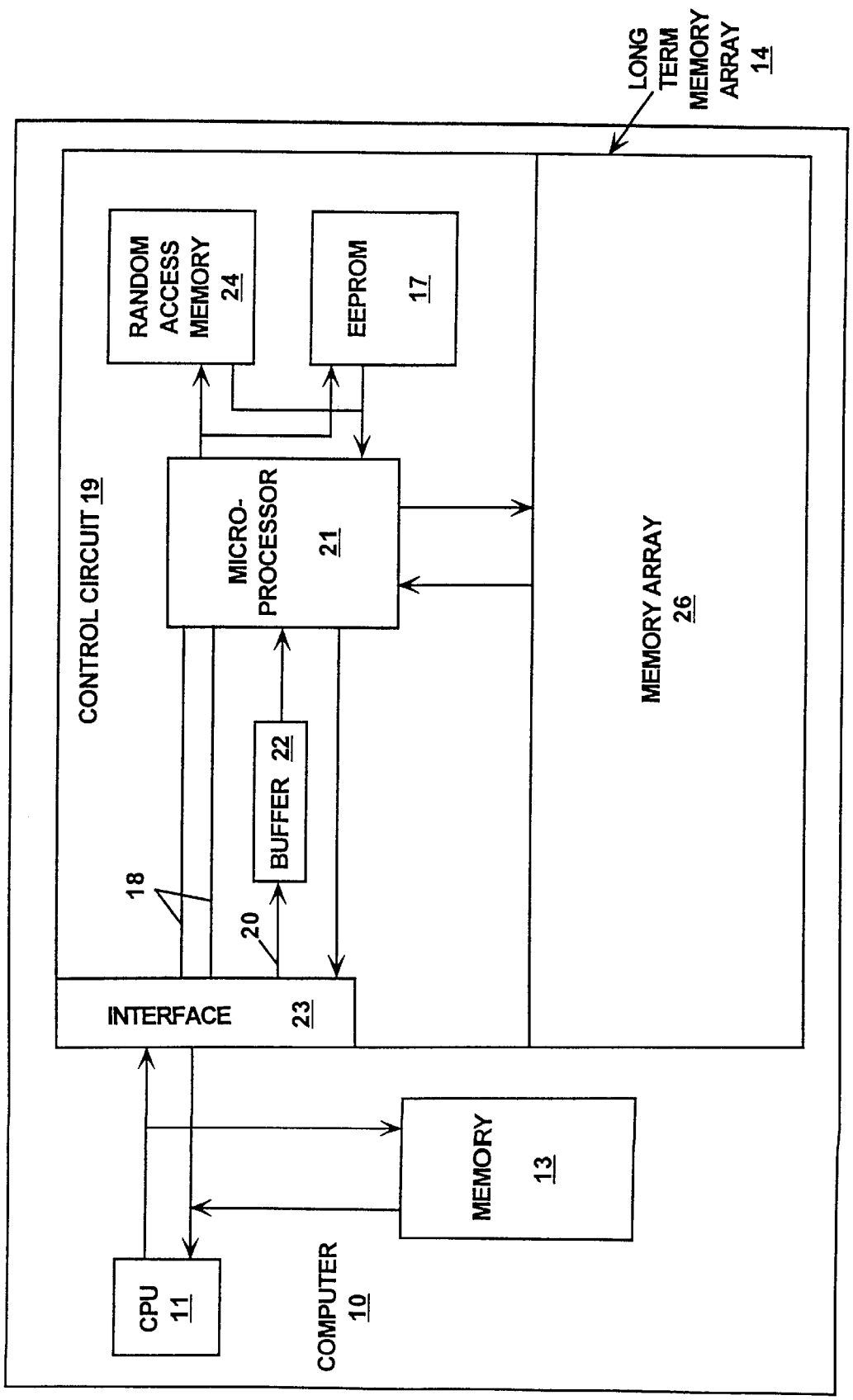
FIG. 2 is a block diagram illustrating a portion of the circuitry of FIG. 1 which may be utilized to accomplish the process of the present invention.

Referring now to FIG. 2, there is illustrated a block diagram of a circuit by which the present invention may be practiced. The circuit of FIG. 2 shows only those elements of the computer 10 of FIG. 1 necessary to explain the present invention. The host computer circuit 10 shown includes the central processing unit 11 adapted to carry out processes stored in the random access memory 13. These processes may include a process by which control processes used to manage a long term memory array 14 may be updated. These control processes are stored in a flash EEPROM memory 17 used as read only memory in a control circuit 19 associated with the long term memory array 14 in which the array portion is shown as memory array 26. In one embodiment, the memory array 26 is a flash EEPROM memory array.

The control circuit 19 of the memory array 26 includes a microprocessor 21 which is connected to receive control signals from the central processing unit 11 of the host computer 10 through an interface 23. The interface 23 is an industry standard interface utilized with a typical electro-mechanical hard disk drive. Such an interface 23 may be an IDE/ATA interface in one embodiment in which the invention is utilized. The details of such an interface are specified in *ATA (AT Attachment), Revision* 3.0, Nov. 22, 1991, submitted for approval by ANSI by the Accredited Standards Committee on Information Processing Standards.

The interface 23 is connected to control conductors 18 and data conductors 20. A sector buffer 22 is arranged to receive data on the conductors 20 from the interface 23 and to transfer data to the microprocessor 21 under control of various control signals. The sector buffer 22 may be the same buffer which is utilized to transfer data to and from the flash EEPROM memory array 26 during typical read and write operations of that array. Such a sector buffer 22 is specified as a component of a typical IDE interface used with a great plurality of the hard disk drives utilized by personal computers. Such a buffer 22 is capable of transferring an amount of data equivalent to at least one or more sectors used in storing data in an electro-mechanical hard disk drive, typically 512 bytes of data.

Also associated with the microprocessor 21 is the flash EEPROM 17 which functions as read only memory. A random access memory array 24, which in one embodiment may utilize static random access memory cells, is also associated with the microprocessor 21 and is used by the microprocessor for storing data in carrying out its various functions.

The flash EEPROM memory 17 used as read only memory is used to store processes which are run by the microprocessor 21 to carry out the various management functions associated with the flash EEPROM memory array. An example of such a process is the process outlined above by which write operations are accomplished. Another such process is a cleanup process which is disclosed in detail in U.S. patent application Ser. No. 07/969,760, entitled A Method Of Cleaning Up A Solid State Memory Disk Storing Floating Sector Data, S. Wells et al, filed Oct. 30, 1992, and assigned to the assignee of the present invention. This process basically controls the operation by which one from among a plurality of blocks of flash EEPROM memory array is selected to be erased based essentially on which block has more invalid data. The valid data on the block selected is read and moved to free space in the flash EEPROM memory array, the block to be erased is erased so that it may be placed back in operation as free space in the flash EEPROM memory array, and various information regarding the array is updated in tables stored in the random access memory 24 and in the flash EEPROM memory array 26 itself.

Figure 3:
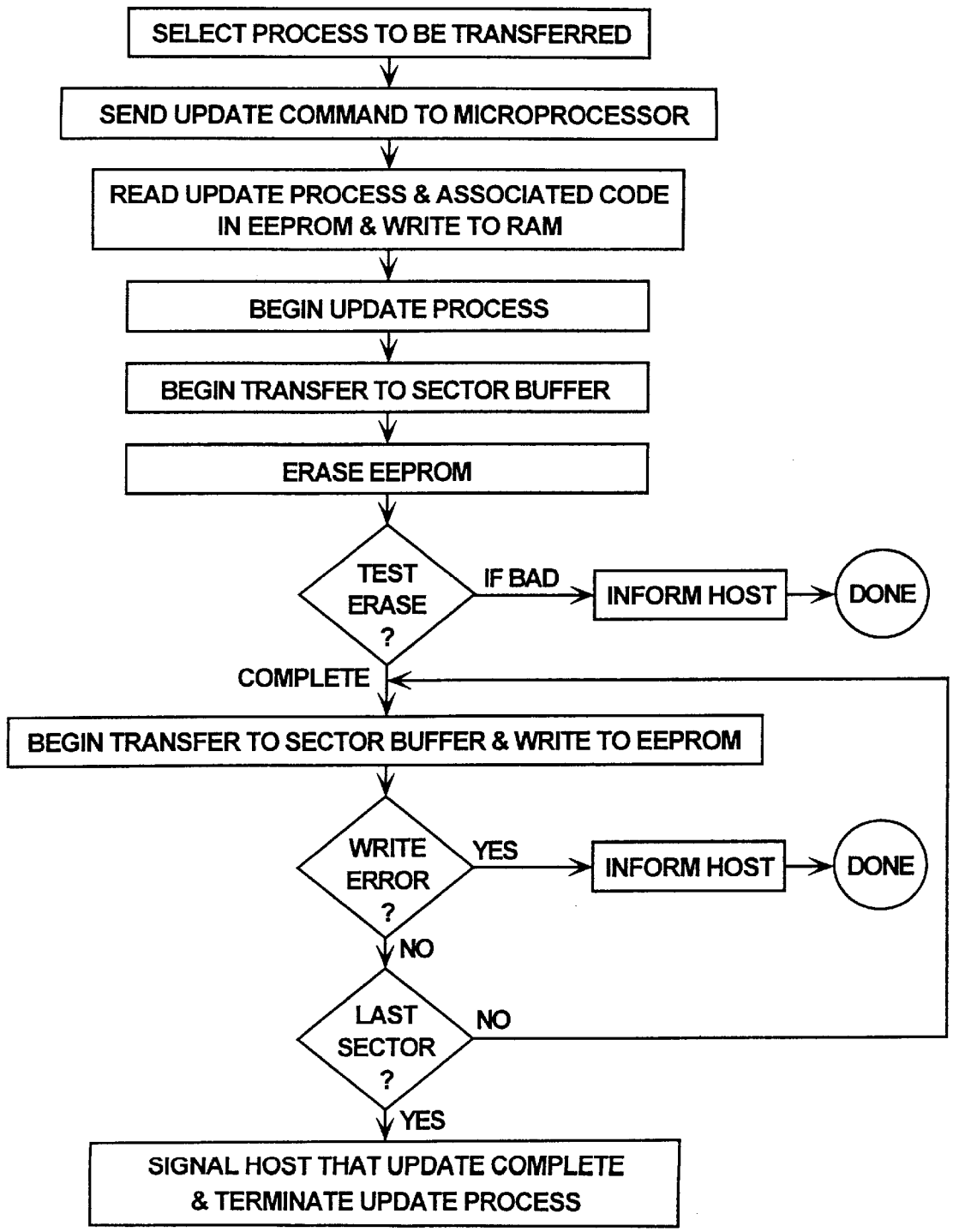
FIG. 3 is a flow chart illustrating a method in accordance with the present invention.

Numerous other processes for managing reading from, writing to, and erasing the flash EEPROM memory array are also stored in the read only memory provided by the flash EEPROM memory 17. It is desirable that this same circuitry which is utilized for managing the flash EEPROM memory array 26 be utilized to allow the host computer 10 to update the control processes stored in the flash EEPROM memory 17. This is accomplished in the present invention by the process illustrated in FIG. 3. In that process, the host computer 10 runs a utility process which selects a portion of memory by address and length to be used to update flash EEPROM memory 17. The utility process also transfers a command "update" to the microprocessor 21 (an Intel 80188 in one embodiment) through the interface 23 and on the conductors 18 associated therewith. In response to this "update" command, the microprocessor 21 reads the code stored in the flash EEPROM memory 17 used by the "update" process and writes that code to random access memory 24. Typically, for each process moved from the EEPROM memory 17 to the random access memory 24, the microprocessor 21 reads a byte stored in memory 17 and moves that byte to the random access memory 24; it then moves the next byte is the same manner and continues until the entire process has been moved and an end-of-process indication is encountered. The processes moved include in addition to the update process, a write process and an erase process used by the microprocessor 21 whenever the memory 17 is written or erased.

When the data has been transferred to the random access memory 24, a jump command in the update process causes the microprocessor to jump for its next instruction to the address at which the update code commences in the random access memory 24. The microprocessor 21 then begins executing the update code stored in random access memory 24 to execute the update process.

The update process begins by erasing the flash EEPROM memory 17. This is accomplished by causing the microprocessor to jump to the beginning of the erase process transferred from the memory 17 to the random access memory 24. It should be noted that, like blocks of the flash EEPROM memory array, the memory 17 is all erased at once. Thus, once the memory 17 has been erased, the processes for managing the microprocessor 21 no longer exist within the control circuit 19.

The erase process is carried out by the microprocessor 21. In this process, once the array 17 has been erased, each byte (or word, depending on the circuitry of the controller 19) is tested to determine that the erasure is complete. The testing is accomplished by reading back each byte (or word) from the read only memory 17 and testing the condition of the bits to determine that the memory cells of the flash EEPROM memory 17 have been placed in the correct erased (typically a one) condition.

The update process then signals the host computer 10 through the interface 23 that the erase operation is complete. This causes the host utility to furnish the new version of the code to be stored in the read only memory 17. In one embodiment of the invention, this code is furnished in standard Intel 86 hex format on a sector by sector basis to the interface 23 and transferred to the sector buffer 22 under control of the utility program. This format transfers data with an address, a record length, and a check-sum error detecting code. The host computer furnishes records which comprise the new version of the code to the sector buffer 22 through the interface 23. The sector buffer 22 is typically large enough to holds a significant number of sectors so that while the host is loading the sector buffer 22, the microprocessor 21 is writing the data which has been loaded to the flash EEPROM memory 17. The utility being run on the host computer furnishes the data to be stored in the flash EEPROM memory 17 sector by sector until it reaches the end-of-process indication.

The update process controls the microprocessor 21 to write the code stored by the host in the sector buffer 22, beginning with the first sector stored, on a record by record to the addresses in the flash EEPROM read only memory 17 indicated by the code. The update process does this by running the write process stored previously in the random access memory 24. The write process takes the write address from each record and stores the data in the record at that address in the read only memory 17. The write process includes steps which test to determine that the code written is correct. This is accomplished in one embodiment by reading back the data written to each byte or word of the read only memory 17 and comparing the bits of data with the bits which were to be stored. If the data is found to be incorrect, the process indicates the error to the host computer and aborts.

Once the data from the first sector has been correctly written, the update process signals the host computer that the sector has been written. The utility being run on the host computer continues to furnish the sectors of data to be stored in the flash EEPROM memory 17. As the data is furnishes, it is written and its correctness is ascertained by the update process in the same manner as has been described above.

The writing of data continues until the read only memory 17 has been completely rewritten. This is determined when the microprocessor 21 encounters the end-of-process record from the host computer indicating that a particular sector transferred to the sector buffer 22 is the last sector to be written. This end-of-process record is a standard part of the Intel 86 hex format. When this last sector has been correctly written, the microprocessor 21 signals to the host computer 10 that the rewriting of the read only memory 17 is completed. At this point, the host may indicate to the user that a reboot of the system is necessary; or it may cause the microprocessor 21 to jump to the reset command address for the microprocessor 21. When the microprocessor moves to this address, it is reset to utilize the new processes stored in the flash EEPROM memory 17.

Using this process, the present invention allows the read only memory of the control circuitry on the flash EEPROM array to be reprogrammed while it remains a part of the host computer. Such a process may be easily run by a user and makes use of the circuitry already in place in the interface and control circuitry of the flash EEPROM array.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus comprising:
   a microprocessor to execute a plurality of processes for controlling operations of a long term memory array;
   an EEPROM memory, coupled to the microprocessor, to store the plurality of processes; and
   a random access memory, coupled to the microprocessor, to store one or more of the plurality of processes for execution by the microprocessor;
   the microprocessor, in response to an update command from a host processor, to write an update process stored in the EEPROM memory to the random access memory and execute the update process to erase the EEPROM memory, receive a predetermined amount of data from the host processor through a standard disk drive interface, wherein the host processor provides other data to the long term memory array via the standard disk drive interface as if the long term memory array were a standard disk drive, the microprocessor further to write the predetermined amount of data to the EEPROM memory, and continue receiving and writing the predetermined amount of data until the EEPROM memory has been updated, the microprocessor and the host processor to reset after the EEPROM memory has been updated.

2. The apparatus of claim 1 wherein the predetermined amount of data comprises a sector of data.

3. The apparatus of claim 1 further comprising a buffer to receive the predetermined amount of data from the host processor, the microprocessor to write the predetermined amount of data from the buffer to the EEPROM.

4. The apparatus of claim 1 wherein the microprocessor, in response to the update command from the host processor, is further to write all processes used by the update process stored in the EEPROM memory to the random access memory.

5. The apparatus of claim 1 wherein the microprocessor is further to execute the update process to verify successful erasure of the EEPROM memory, and write the predetermined amount of data to the microprocessor only if erasure of the EEPROM memory was successful.

6. An apparatus for updating an EEPROM memory which stores processes run on a microprocessor used to control operations of a long term memory array, the apparatus comprising:
   means for writing, in response to an update command of a host processor, an update process stored in the EEPROM memory to a random access memory associated with the microprocessor; and
   means for using the update process stored in random access memory, said means for using comprising
      means for erasing the EEPROM memory,
      means for furnishing a predetermined amount of data to the microprocessor from a host processor through a standard disk drive interface, wherein the host processor provides other data to the long term memory array via the standard disk drive interface as if the long term memory array were a standard disk drive,
      means for writing the predetermined amount of data to the EEPROM memory,
      the means for furnishing and means for writing continuing the furnishing and the writing until the EEPROM memory has been updated, and
      means for resetting the microprocessor and the host processor after the EEPROM memory has been updated.

7. The apparatus of claim 6 wherein the predetermined amount of data comprises a sector of data.

8. The apparatus of claim 6 further comprising:
   means for buffering the predetermined amount of data received from the host processor, the means for writing the predetermined amount of data to the EEPROM memory comprises means for writing the predetermined amount of data from the means for buffering to the EEPROM memory.

9. The apparatus of claim 6 wherein the means for writing the update process further comprising:
   means for writing all processes stored in the EEPROM memory used by the update process to the random access memory associated with the microprocessor.

10. The apparatus of claim 6 wherein the means for using the update process further comprises:
    means for verifying successful erasure of the EEPROM; and
    means for furnishing the predetermined amount of data to the microprocessor only if erasure of the EEPROM was successful.

11. A system comprising:
    a host processor; and
    a long term memory coupled to the host processor, the long term memory comprising
       a microprocessor to execute a plurality of processes for controlling operations of the long term memory array;
       an EEPROM memory, coupled to the microprocessor, to store the plurality of processes; and
       a random access memory, coupled to the microprocessor, to store one or more of the plurality of processes for execution by the microprocessor;
       the microprocessor, in response to an update command from the host processor, to write an update process stored in the EEPROM memory to the random access memory and execute the update process to erase the EEPROM memory, receive a predetermined amount of data from the host processor through a standard disk drive interface, wherein the host processor provides other data to the long term memory array via the standard disk drive interface as if the long term memory array were a standard disk drive, the microprocessor further to write the predetermined amount of data to the EEPROM memory, and continue receiving and writing the predetermined amount of data until the EEPROM memory has been updated, the microprocessor and the host processor to reset after the EEPROM memory has been updated.

12. The system of claim 11 wherein the predetermined amount of data comprises a sector of data.

13. The system of claim 11, the long term memory array further comprising a buffer to receive the predetermined amount of data from the host processor, the microprocessor to write the predetermined amount of data from the buffer to the EEPROM.

14. The system of claim 11 wherein the microprocessor, in response to the update command from the host processor, is further to write all processes used by the update process stored in the EEPROM memory to the random access memory.

15. The system of claim 11 wherein the microprocessor is further to execute the update process to verify successful erasure of the EEPROM memory, and write the predetermined amount of data to the microprocessor only if erasure of the EEPROM memory was successful.

* * * * *